US011305667B2

(12) United States Patent
Ichikawa (10) Patent No.: US 11,305,667 B2
(45) Date of Patent: Apr. 19, 2022

(54) VEHICLE AND POWER CONTROL SYSTEM

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 16/190,913

(22) Filed: Nov. 14, 2018

(65) Prior Publication Data

US 2019/0160962 A1 May 30, 2019

(30) Foreign Application Priority Data

Nov. 24, 2017 (JP) .............................. JP2017-225964

(51) Int. Cl.
*H02J 7/00* (2006.01)
*B60L 58/13* (2019.01)
*H02J 7/35* (2006.01)
*B60L 53/14* (2019.01)
*B60L 55/00* (2019.01)

(52) U.S. Cl.
CPC .............. *B60L 58/13* (2019.02); *B60L 53/14* (2019.02); *B60L 55/00* (2019.02); *H02J 7/35* (2013.01)

(58) Field of Classification Search
USPC ....................................................... 320/109
See application file for complete search history.

(56) References Cited

U.S. PATENT DOCUMENTS

| | | | |
|---|---|---|---|
| 8,421,414 B2* | 4/2013 | Lee ......................... | G06F 1/263 320/132 |
| 2009/0313034 A1 | 12/2009 | Ferro et al. | |
| 2013/0113413 A1* | 5/2013 | Harty ....................... | H02J 7/35 320/101 |
| 2013/0124029 A1* | 5/2013 | Izumi ..................... | B60L 58/13 701/22 |
| 2015/0008884 A1* | 1/2015 | Waki ....................... | H02J 7/007 320/134 |
| 2015/0054466 A1* | 2/2015 | Kinomura ............. | H02J 7/0027 320/134 |
| 2015/0120104 A1* | 4/2015 | Stefanon ................. | B60L 58/13 701/22 |
| 2016/0001766 A1* | 1/2016 | Mori ....................... | B60L 58/13 701/22 |
| 2017/0373355 A1* | 12/2017 | Kagawa ............. | H01M 10/482 |
| 2019/0288347 A1 | 9/2019 | Yokoyama et al. | |

FOREIGN PATENT DOCUMENTS

| | | |
|---|---|---|
| JP | 2012-085396 A | 4/2012 |
| JP | 5123419 B1 | 1/2013 |
| JP | 2017-143634 A | 8/2017 |
| WO | 2018084152 A1 | 5/2018 |

* cited by examiner

*Primary Examiner* — Samuel Berhanu
(74) *Attorney, Agent, or Firm* — Dinsmore & Shohl LLP (57) ABSTRACT

A vehicle includes a power storage device, a connector, a power converter, and an ECU. The connector and the power converter are configured to supply, to the power facility, power stored in the power storage device. When the vehicle is connected to the power facility via a power cable, the ECU is configured to control an upper limit SOC and a lower limit SOC in association with time. The upper limit SOC and lower limit SOC define an SOC usable range of the power storage device.

11 Claims, 10 Drawing Sheets

VEHICLE AND POWER CONTROL SYSTEM

CROSS-REFERENCE TO RELATED APPLICATIONS

This nonprovisional application claims priority to Japanese Patent Application No. 2017-225964 filed on Nov. 24, 2017, with the Japan Patent Office, the entire contents of which are hereby incorporated by reference.

BACKGROUND

Field

The present disclosure relates to a vehicle and a power control system, particularly, a vehicle configured to exchange power with a power facility provided outside the vehicle, as well as a power control system.

Description of the Background Art

Japanese Patent No. 5123419 discloses a vehicle configured to exchange power with a power facility provided outside the vehicle. In this vehicle, a power storage device mounted on the vehicle can be charged from the power supply facility by connecting, to an inlet of the vehicle, a charging connector for connecting the vehicle to the power supply facility external to the vehicle. On the other hand, by connecting, to the inlet, a power supplying connector for connecting the vehicle to a target facility to be supplied with power and external to the vehicle, power can be supplied from the vehicle to the target facility.

In recent years, capacities of in-vehicle power storage devices have been increasing. In response to such an increase in capacities of power storage devices, it has been considered to lower a peak of power demand for a system power supply by supplying the system power supply with power stored in an in-vehicle power storage device during a time period during which an amount of use of the system power supply reaches a peak, for example.

However, if the power stored in the in-vehicle power storage device is supplied to outside the vehicle (for example, to the system power supply) without a plan, the power storage device may have a decreased SOC (State Of Charge) upon use (traveling) of the vehicle. As a result, a sufficient traveling distance may be unable to be secured during the use of the vehicle.

SUMMARY

The present disclosure has been made to solve such a problem, and has an object to suppress a power storage device from having a decreased SOC upon use (traveling) of a vehicle configured to exchange power with a power facility provided outside the vehicle.

A vehicle according to the present disclosure includes a power storage device, a power supply device, and a control device. The power supply device is configured to supply, to outside the vehicle, power stored in the power storage device. The control device is configured to control a usable range of an SOC of the power storage device in association with time, when the power supply device is connected to a power facility provided outside the vehicle.

According to the above-described configuration, the range of the SOC of the power storage device can be controlled in consideration of the time period during which the vehicle is used. As a result, while the vehicle is not used, the SOC usable range is expanded to flexibly cope with a power demand situation of the power facility configured to exchange power with the vehicle, for example. On the other hand, during the time period during which the vehicle is used (time period during which the vehicle is highly likely to be used), the SOC usable range is increased to suppress the vehicle from having a decreased SOC upon use (traveling) of the vehicle.

The power supply device may be further configured to charge the power storage device using power supplied from the power facility. The control device may be further configured to set, in association with the time, the charging of the power storage device using the power supplied from the power facility.

This vehicle can set, in association with time, the charging of the power storage device using the power supplied from the power facility, and is configured to perform so-called "timer charging". Since the vehicle can set the range of the SOC of the power storage device in consideration of the time period during which the vehicle is used, according to this vehicle, a schedule of the timer charging can be set appropriately in accordance with the SOC range set in consideration of the time period during which the vehicle is used.

The vehicle may further include a setting device configured to allow a user to set the SOC usable range.

The setting device may be further configured to allow the user to set a time period during which the SOC usable range is used.

According to the above-described configurations, the SOC usable range and the time period during which the SOC usable range is used can be set by the user in view of a state of use of the vehicle or the like.

The SOC usable range may be defined by an upper limit SOC indicating an upper limit of use of the SOC and a lower limit SOC indicating a lower limit of the use of the SOC, and the setting device may be configured to allow the user to set the upper limit SOC and the lower limit SOC separately.

Accordingly, the user can manage the SOC of the power storage device to fall within a desired range in accordance with a schedule of use of the vehicle and a power demand situation of the power facility (for example, the user's house) configured to exchange power with the vehicle.

The vehicle may further include a communication device configured to communicate with a terminal device of a user of the vehicle. The communication device may be configured to receive, from the terminal device, the SOC usable range set by the user in the terminal device.

The communication device may be further configured to receive, from the terminal device, a time period during which the SOC usable range is used, the time period being set by the user in the terminal device.

According to such configurations, the SOC usable range and the time period during which the SOC usable range is used can be set from the terminal device by the user without riding on the vehicle.

The power supply device may be further configured to charge the power storage device using power supplied from the power facility. The control device may be configured to permit the SOC to exceed an upper limit of the usable range when the power facility is a facility configured to supply power to the vehicle and receive power from the vehicle.

According to such a configuration, surplus power or the like at the power facility side can be transitionally stored in the power storage device of the vehicle, and the power can be then supplied from the vehicle to the power facility.

Therefore, according to this vehicle, the surplus power or the like generated in the power facility can be utilized effectively.

The control device may be configured to permit the SOC to exceed an upper limit of the SOC usable range when the power with which the power storage device is charged is surplus power resulting from solar power generation.

According to such a configuration, the surplus power resulting from solar power generation can be transitionally stored in the power storage device of the vehicle, and the power can be then supplied from the vehicle to the power facility. Therefore, according to this vehicle, the surplus power resulting from solar power generation can be utilized effectively.

Further, a power control system according to the present disclosure includes a vehicle and a terminal device. The vehicle includes a power storage device, a power supply device, and a control device. The power supply device is configured to supply, to outside the vehicle, power stored in the power storage device. The control device is configured to control a usable range of an SOC of the power storage device in association with time, when the power supply device is connected to a power facility provided outside the vehicle. The terminal device includes: a setting device configured to allow a user to set the SOC usable range; and a communication device configured to transmit, to the vehicle, the SOC usable range set by the user in the setting device.

Further, the SOC usable range may be defined by an upper limit SOC indicating an upper limit of use of the SOC and a lower limit SOC indicating a lower limit of the use of the SOC, and the setting device may be configured to allow the user to set the upper limit SOC and the lower limit SOC separately.

Accordingly, the user can set the SOC usable range from the terminal device without riding on the vehicle. Further, according to the description above, since the upper limit SOC and the lower limit SOC can be set separately, the user can manage the SOC of the power storage device to fall within a desired range in accordance with a state of use of the vehicle and a power demand situation of the power facility (for example, the user's house) configured to exchange power with the vehicle.

The foregoing and other objects, features, aspects and advantages of the present disclosure will become more apparent from the following detailed description of the present disclosure when taken in conjunction with the accompanying drawings.

DETAILED DESCRIPTION

The following describes embodiments of the present disclosure with reference to figures in detail. It should be noted that the same or corresponding portions in the figures are given the same reference characters and are not described repeatedly.

First Embodiment

<Entire Configuration>

Figure 1:
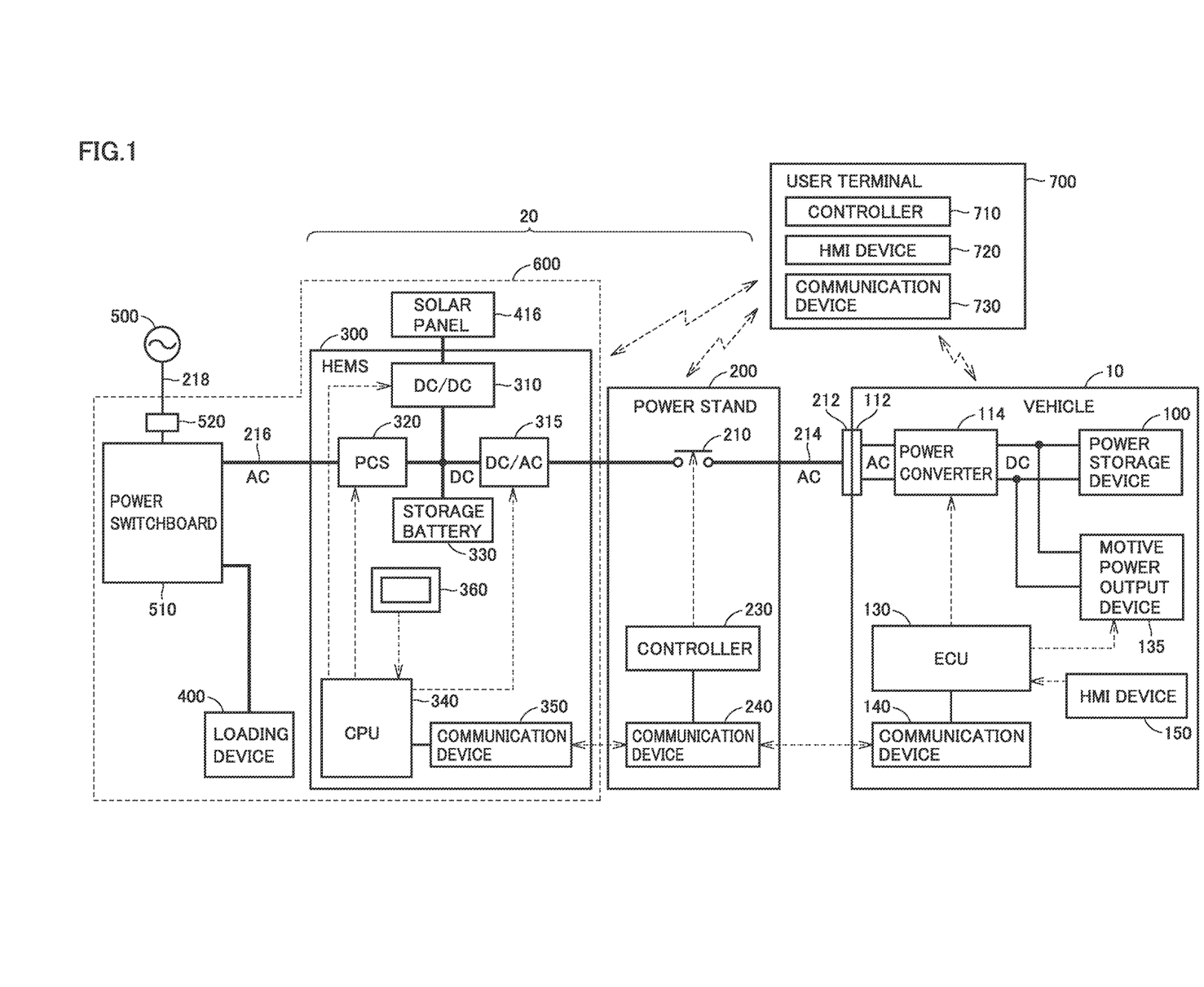
FIG. 1 schematically shows an entire configuration of a power system including a vehicle according to a first embodiment.

FIG. 1 schematically shows an entire configuration of a power system including a vehicle according to a first embodiment. The power system includes a vehicle 10, a power facility 20, a loading device 400, a commercial system power supply 500, a power switchboard 510, and a user terminal 700. Power facility 20 includes a power stand 200, a HEMS (Home Energy Management System) 300, and a solar panel 416.

HEMS 300, loading device 400, solar panel 416, and power switchboard 510 are provided in a house 600.

Vehicle 10 is an electrically powered vehicle configured to generate driving power for traveling using electric power and to exchange electric power with power stand 200. It should be noted that the configuration of the electrically powered vehicle is not particularly limited as long as the electrically powered vehicle can travel using electric power. Examples of vehicle 10 include a hybrid vehicle, an electric vehicle, and the like.

Vehicle 10 includes a power storage device 100, a connector 112, a power converter 114, a motive power output device 135, an ECU (Electronic Control Unit) 130 for controlling a general operation of vehicle 10, a communication device 140, and a HMI (Human Machine Interface) device 150.

Vehicle 10 can charge power storage device 100 using power supplied from power stand 200. Moreover, vehicle 10 can also discharge (supply) power of power storage device 100 to power stand 200.

Power storage device 100 is a re-chargeable power storage element. Representatively, a secondary battery is applied thereto, such as a lithium ion battery or a nickel-metal hydride battery. Alternatively, power storage device 100 may be constituted of a power storage element other than a battery, such as an electric double layer capacitor.

Connector 112 is connectable to a connector 212 provided at the tip of a power cable 214 of power stand 200. Power converter 114 is connected between power storage device 100 and connector 112. Power converter 114 is controlled in accordance with a control signal from ECU 130. When charging power storage device 100 with power supplied from power stand 200, power converter 114 converts the power supplied from power stand 200 into power with which power storage device 100 can be charged. On the other hand, when discharging power from power storage device 100 to power stand 200, power converter 114 converts power of power storage device 100 into power that can be received by power stand 200. Power converter 114 is constituted of a bidirectional AC/DC converter, for example.

Motive power output device 135 generates driving power of vehicle 10 using the electric power stored in power storage device 100. Specifically, motive power output device 135 generates driving power of vehicle 10 based on a driving command signal from ECU 130, and outputs the generated driving power to driving wheels (not shown) of vehicle 10. Moreover, when motive power output device 135 receives an electric power generation command signal from ECU 130, motive power output device 135 generates electric power and supplies the electric power to power storage device 100.

Communication device 140 is an interface for communicating with an device external to the vehicle (such as power stand 200, HEMS 300, or user terminal 700). Communication device 140 is connected to ECU 130 via a communication line, transmits, to a device external to the vehicle, information sent from ECU 130, and sends, to ECU 130, information received from a device external to the vehicle.

HMI device 150 is a device configured to provide various information to the user of vehicle 10 and receive an operation of the user of vehicle 10. HMI device 150 includes a display including a touch panel, a speaker, and the like.

Further, although not shown in the figure, vehicle 10 includes a plurality of sensors for detecting various physical quantities required for control of vehicle 10, such as: a vehicle speed sensor configured to detect a vehicle speed; and a monitoring sensor configured to detect a state (voltage, current, temperature, or the like) of power storage device 100. Each of these sensors outputs a detection result to ECU 130.

ECU 130 includes a CPU (Central Processing Unit) and a memory (not shown), and controls each device of vehicle 10 based on information stored in the memory or information from each sensor. It should be noted that they can be controlled by not only a process performed by software but also a process performed by dedicated hardware (electronic circuit) constructed therefor.

Via communication device 140, ECU 130 performs wireless or wired communication with communication devices 240, 350, 730 respectively provided in power stand 200, HEMS 300, and user terminal 700 external to the vehicle.

Power stand 200 is a facility for charging or discharging vehicle 10. Power stand 200 includes power cable 214, a relay 210, a controller 230, and communication device 240. Power stand 200 is electrically connected to power switchboard 510 through HEMS 300. It should be noted that power stand 200 may be provided inside house 600.

Power cable 214 has one end connected to relay 210, and has the other end provided with connector 212. When supplying power to vehicle 10 and receiving power from vehicle 10, connector 212 of power cable 214 is connected to connector 112 of vehicle 10 and relay 210 is closed. An operation of opening and closing relay 210 is controlled by controller 230.

HEMS 300 is electrically connected to power switchboard 510, power stand 200, and solar panel 416. HEMS 300 includes a DC/DC converter 310, a DC/AC converter 315, a PCS (Power Conditioning System) 320, a storage battery 330, a CPU 340, a communication device 350, and an operation panel 360. DC/DC converter 310, DC/AC converter 315, and PCS 320 are controlled by CPU 340.

DC/DC converter 310 is connected to solar panel 416 installed on a roof of house 600. DC/DC converter 310 converts, into an appropriate value, a DC voltage value of power generated by solar panel 416.

DC/AC converter 315 is connected to vehicle 10 via power stand 200. DC/AC converter 315 converts, into DC power, AC power supplied from vehicle 10 via power stand 200, and outputs the DC power to PCS 320 and storage battery 330. Moreover, DC/AC converter 315 converts, into AC power, DC power supplied from at least one of DC/DC converter 310, PCS 320, and storage battery 330, and outputs the AC power to vehicle 10 via power stand 200.

PCS 320 is connected to system power supply 500 via power switchboard 510. System power supply 500 is representatively constituted of a single-phase AC power supply. PCS 320 converts, into DC power, AC power supplied from system power supply 500 via power switchboard 510, and outputs the DC power to DC/AC converter 315 and storage battery 330. Meanwhile, PCS 320 can convert, into AC power, DC power supplied from at least one of DC/DC converter 310, storage battery 330, and DC/AC converter 315 (power storage device 100 of vehicle 10), and can output the AC power to system power supply 500 via power switchboard 510.

Storage battery 330 is a re-chargeable power storage element, and a secondary battery such as a lithium ion battery, a nickel-metal hydride battery, or a lead storage battery is applied thereto representatively. In addition to power from vehicle 10, power generated by solar panel 416 installed on house 600 is supplied to storage battery 330 via DC/DC converter 310. Furthermore, storage battery 330 can be supplied with power from system power supply 500.

Operation panel 360 is operated by a user of HEMS 300. Operation panel 360 is configured for selection of (i) start and end of supply of power to vehicle 10 and (ii) start and end of reception of power from vehicle 10. CPU 340 transmits, to controller 230 via communication devices 350, 240, a command signal corresponding to an operation performed by the user via operation panel 360. Controller 230 controls relay 210 in accordance with the command signal from CPU 340.

A breaker 520 is provided at a power line 218 that connects system power supply 500 and power switchboard 510 to each other. Breaker 520 is configured to disconnect system power supply 500 and power switchboard 510 from each other by cutting off power line 218 when an excessive amount of current exceeding a permissible value flows in power line 218. For example, breaker 520 may be configured to be melted and disconnected when a current exceeding the permissible value flows, such as a current fuse. Breaker 520 may be configured to switch a relay to the open state when a current exceeding the permissible value is detected by a current sensor or the like.

Loading device 400 is any electric device configured to operate when receiving power from power switchboard 510. Loading device 400 is a home electric appliance used in house 600, for example.

User terminal 700 is a communication terminal (smartphone or the like) that can be carried by the user of vehicle 10. User terminal 700 includes a controller 710, an HMI device 720, and a communication device 730.

HMI device 720 is a device configured to provide various information to the user and receive an operation of the user. HMI device 720 includes a display including a touch panel. Communication device 730 is an interface for wirelessly communicating with vehicle 10, power stand 200, and HEMS 300. Controller 710 includes a CPU and a memory (not shown), and controls each device (HMI device 720, communication device 730, and the like) of user terminal 700 based on information stored in the memory, a content input into HMI device 720, and the like.

<Setting of SOC Usable Range of Power Storage Device 100>

In power management for in-vehicle power storage devices, a priority has been given to securing a traveling distance of a vehicle by efficiently charging a power storage device. In future, in response to increase in capacities of power storage devices, it is expected that needs will grow in lowering a peak of power demand of a system power supply by supplying the system power supply with power stored in an in-vehicle power storage device during a time period during which an amount of use of the system power supply reaches a peak, for example.

However, if the power stored in the in-vehicle power storage device is supplied to the system power supply without a plan, the power storage device may have a decreased SOC upon use (traveling) of the vehicle. As a result, a sufficient traveling distance may be unable to be secured during the use of the vehicle.

To address this, vehicle 10 according to the first embodiment has a configuration for suppressing occurrence of such a situation. Specifically, vehicle 10 includes power converter 114 (power supply device) configured to supply power stored in power storage device 100 to outside the vehicle. Further, when power converter 114 is connected to power stand 200 via power cable 214, vehicle 10 is configured to control an SOC usable range of power storage device 100 in association with time.

With such a configuration, the range of the SOC of power storage device 100 can be controlled in consideration of a time period during which vehicle 10 is used. For example, while vehicle 10 is not used, the SOC usable range is expanded to flexibly cope with a power demand situation of HEMS 300 configured to exchange power with vehicle 10 via power stand 200. On the other hand, during the time period during which vehicle 10 is used (time period during which vehicle 10 is highly likely to be used), the SOC usable range is increased to suppress vehicle 10 from having a decreased SOC upon use (traveling) of vehicle 10.

Moreover, in this first embodiment, power converter 114 can charge power storage device 100 using power supplied from power stand 200. Further, vehicle 10 is configured to perform so-called "timer charging" in which charging of power storage device 100 using power supplied from power stand 200 is set in association with time. Since vehicle 10 can control the SOC usable range in consideration of the time period during which vehicle 10 is used as described above, according to this vehicle 10, a schedule of the timer charging can be set appropriately in accordance with the SOC usable range set in consideration of the time period during which vehicle 10 is used.

In this first embodiment, the SOC usable range can be set by the user in association with time. Moreover, the user also can set the timer charging. The following describes methods for setting the SOC usable range and the timer charging. In the description below, it will be illustratively described that the user operates user terminal 700 to perform the settings.

Figure 2:
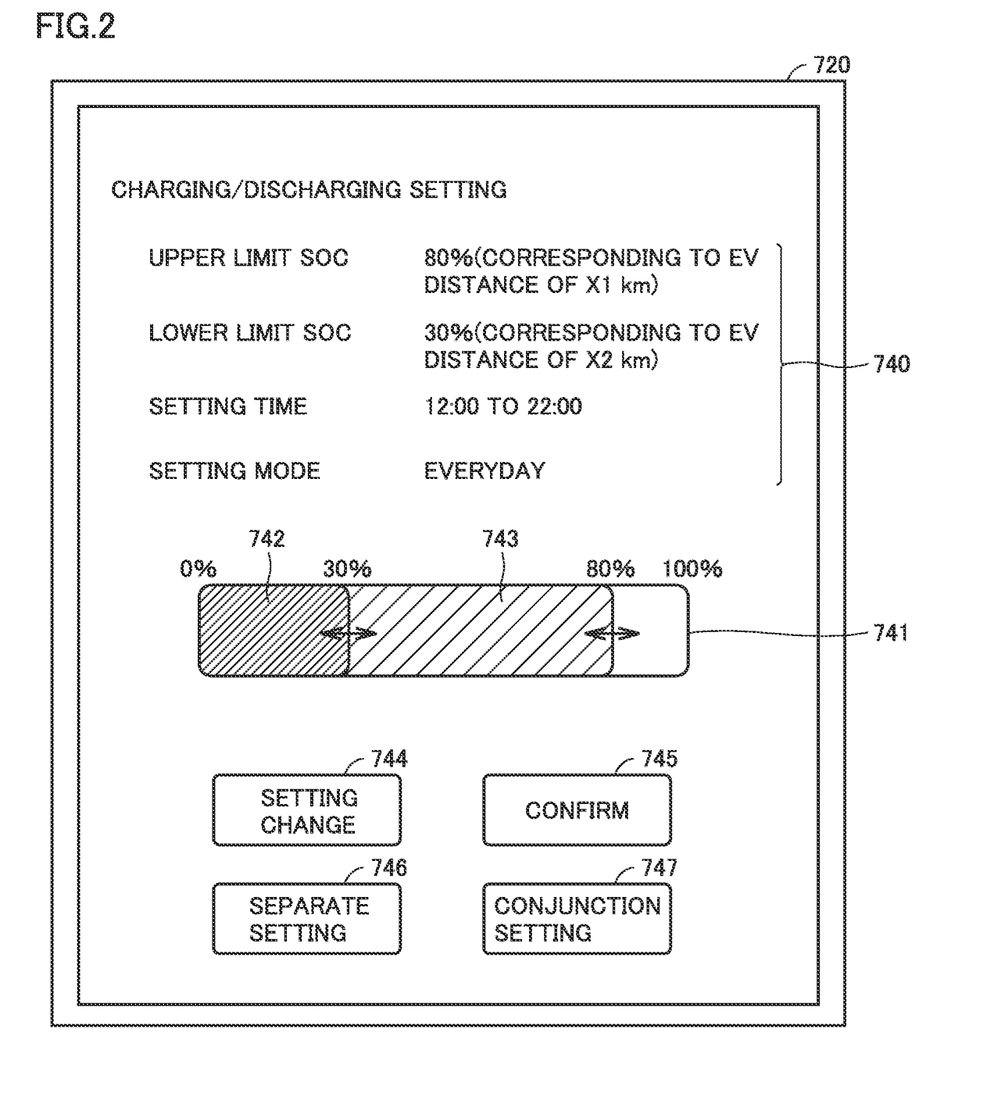
FIG. 2 shows an exemplary setting screen of an SOC usable range as presented on a display of an HMI device of a user terminal.

FIG. 2 shows an exemplary setting screen of the SOC usable range as presented on the display of HMI device 720 of user terminal 700. With reference to FIG. 2, this setting screen includes a setting indication 740, a setting bar 741, indication bars 742, 743, and buttons 744 to 747.

Setting indication 740 presents: a current setting value of an upper limit SOC indicating the upper limit of the SOC usable range; a current setting value of a lower limit SOC indicating the lower limit of the SOC usable range; a setting time for defining a time period during which the set SOC usable range (upper limit SOC and lower limit SOC) is used; and a current setting mode.

It should be noted that as shown in the figure, the setting value of the upper limit SOC may be presented together with an EV distance attained when the SOC is at the upper limit SOC (distance in which vehicle 10 can travel using power stored in power storage device 100), and the setting value of the lower limit SOC may be presented together with an EV distance attained when the SOC is at the lower limit SOC. Each of such EV distances can be calculated based on (i) an amount of stored power calculated based on SOC and (ii) power efficiency of vehicle 10.

The setting mode is a mode for defining whether to apply the set SOC usable range at a set time every day, on specific day(s), or only once.

Indication bar 742 is presented on setting bar 741, and represents the current setting value of the lower limit SOC by way of a length of the bar. Indication bar 743 is presented on setting bar 741, and represents the current setting value of the upper limit SOC by way of a length of the bar.

The user can set the lower limit SOC by touching the right end of indication bar 742 presented on setting bar 741 and sliding it to the right or left. Likewise, the user can set the upper limit SOC by touching the right end of indication bar 743 presented on setting bar 741 and sliding it to the right or left. The set values are presented on setting indication 740 in the fond of numerical values.

Button 744 is a button for allowing the user to change at least one of the upper limit SOC, lower limit SOC, setting time, and setting mode presented on setting indication 740. After touching button 744, the user can change the settings of the upper limit SOC and lower limit SOC at setting bar 741, and can change the settings of the setting time and setting mode at setting indication 740.

Button 745 is a button for completing each of the settings of the upper limit SOC, lower limit SOC, setting time, and setting mode after touching button 744. By touching button 745, the user can confirm each of the settings of the upper limit SOC, lower limit SOC, setting time, and setting mode.

Button 746 is a button for allowing the user to set the upper limit SOC and lower limit SOC separately. By touching button 746, the user can set the upper limit SOC and lower limit SOC separately.

Button 747 is a button for setting the upper limit SOC and lower limit SOC in conjunction with each other. By touching button 747, the user can set the upper limit SOC and lower limit SOC in conjunction with each other (while maintaining a difference in SOC therebetween).

It is assumed that during a time period other than the time period indicated by the setting time, default upper limit SOC and lower limit SOC are set.

When the user operates button 745 for confirming each of the settings, each of the settings of the upper limit SOC, lower limit SOC, setting time, and setting mode is transmitted to vehicle 10 by communication device 730 (FIG. 1).

Figure 3:
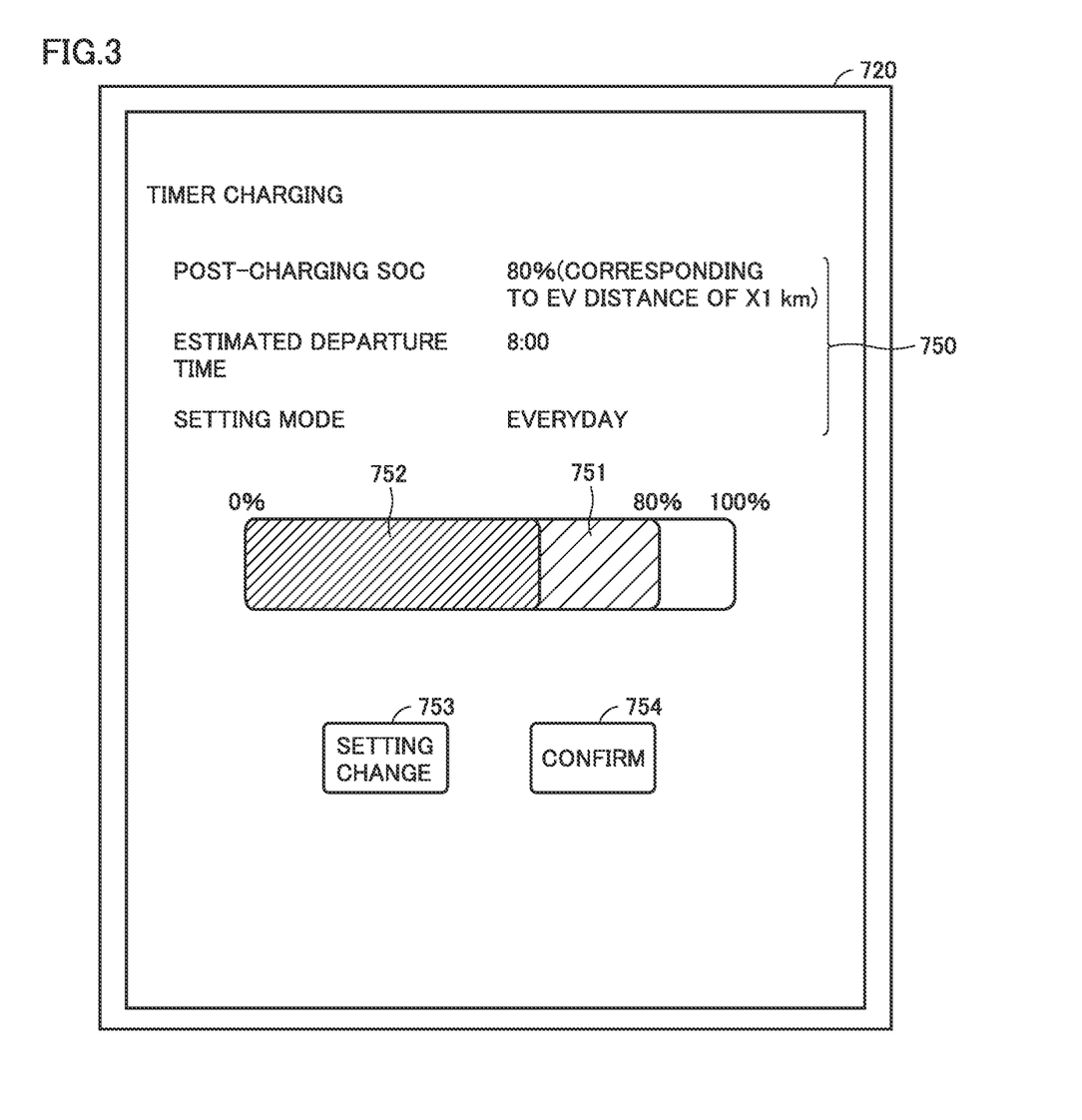
FIG. 3 shows an exemplary setting screen of timer charging as presented on the display of the HMI device of the user terminal.

FIG. 3 shows an exemplary setting screen of the timer charging as presented on the display of HMI device 720 of user terminal 700. With reference to FIG. 3, this setting screen includes a setting indication 750, indication bars 751, 752, and buttons 753, 754.

Setting indication 750 presents: a post-charging SOC indicating an SOC after end of the timer charging; an estimated departure time of vehicle 10; and a current setting mode. In the post-charging SOC, the upper limit SOC set in the setting screen shown in FIG. 2 is set. In the time period other than the time period set in the setting screen of FIG. 2, the default upper limit SOC is set as the post-charging SOC.

The estimated departure time defines a completion time of the timer charging, and the schedule of the timer charging is planned based on the estimated departure time so as to complete the charging of power storage device 100 at the estimated departure time. The setting mode is a mode for defining whether to apply the set timer charging every day, on specific day(s), or only once.

Indication bar 751 presents the value of the post-charging SOC by way of a length of the bar. Indication bar 752 is presented on indication bar 751, and represents the current SOC value by way of a length of the bar.

Button 753 is a button for allowing the user to change at least one of the departure time setting and the setting mode both presented on setting indication 750. After touching button 753, the user can change the settings of the estimated departure time and the setting mode in setting indication 750.

After touching button 753, button 754 is a button for completing each of the settings of the estimated departure time and the setting mode. By touching button 754, the user can confirm each of the settings of the estimated departure time and the setting mode.

When button 754 is operated by the user, each of the settings of the estimated departure time and the setting mode is transmitted to vehicle 10 by communication device 730 (FIG. 1).

Figure 4:
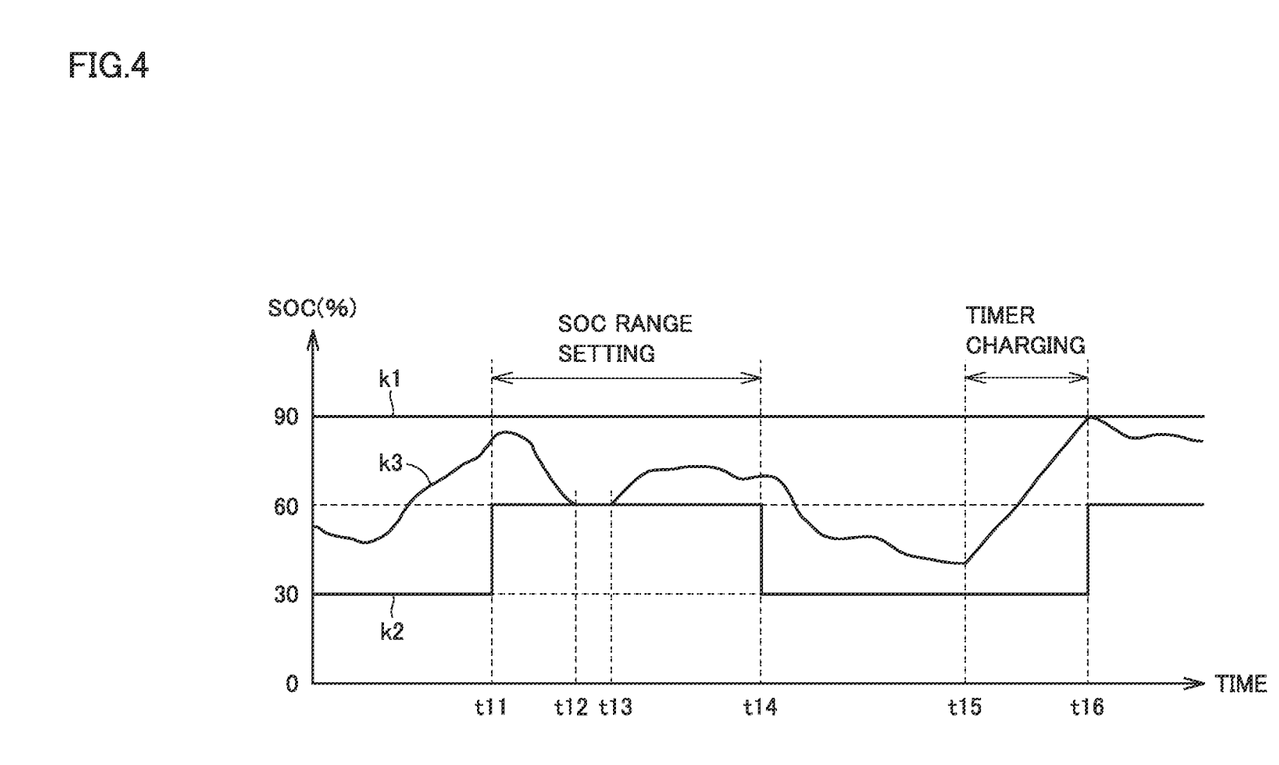
FIG. 4 shows an exemplary SOC usable range and an exemplary change in SOC with passage of time.

FIG. 4 shows an exemplary SOC usable range and an exemplary change in SOC with passage of time. With reference to FIG. 4, a line k1 represents the upper limit SOC indicating the upper limit of the SOC usable range, whereas a line k2 represents the lower limit SOC indicating the lower limit of the SOC usable range. A line k3 represents an actual change in SOC.

It is assumed that in the setting screen shown in FIG. 2, the upper limit SOC and lower limit SOC (SOC usable range) in a time period of times t11 to t14 are set. Before time t11, the upper limit SOC is set to a default of 90%, and the lower limit SOC is set to a default of 30%.

At time t11, in accordance with the upper limit SOC and lower limit SOC set in the setting screen shown in FIG. 2, the upper limit SOC is set to 90% and the lower limit SOC is set to 60%. For example, the time period of times t11 to t14 is a time period during which the user is highly likely to utilize vehicle 10, and therefore the user sets the lower limit SOC at a high value in order to suppress vehicle 10 from having a decreased SOC when using vehicle 10 during this time period.

It should be noted that except for the below-described case of the timer charging, the exchange of power between vehicle 10 and power facility 20 is planned by CPU 340 of HEMS 300 and the actual SOC is basically changed in accordance with the charging/discharging plan made by HEMS 300.

When the SOC is decreased to the lower limit SOC at time t12, the supply of power from vehicle 10 to power stand 200 (HEMS 300) is halted. The exchange of power between vehicle 10 and HEMS 300 is halted until the charging/discharging plan by HEMS 300 is then switched to supply of power from HEMS 300 to vehicle 10.

When the charging/discharging plan by HEMS 300 is switched to the supply of power from HEMS 300 to vehicle 10 at time t13, power is supplied from power stand 200 (HEMS 300) to vehicle 10, thereby increasing the SOC. When the time period set in the setting screen of FIG. 2 has passed at time t14, the lower limit SOC returns to the default of 30%.

It should be noted that although not shown particularly, when the SOC becomes less than the lower limit SOC due to the change in the setting of the lower limit SOC at time t11, supply of power from vehicle 10 to power stand 200 (HEMS 300) is prohibited, whereas supply of power from power stand 200 (HEMS 300) to vehicle 10 is permitted. In this way, the SOC tends to increase to come close to the lower limit SOC.

It is assumed that also after time t16, the upper limit SOC and lower limit SOC (SOC usable range) are set in the setting screen of FIG. 2. It is also assumed that time t16 is set as the estimated departure time of vehicle 10 in the timer charging setting screen of FIG. 3.

Based on the set time t16, the post-charging SOC (FIG. 3) at time t16, and the current SOC, the charging schedule of power storage device 100 is planned. The timer charging is started from time t15 to allow the SOC of power storage device 100 to reach the post-charging SOC (upper limit SOC) at time t16.

Figure 5:
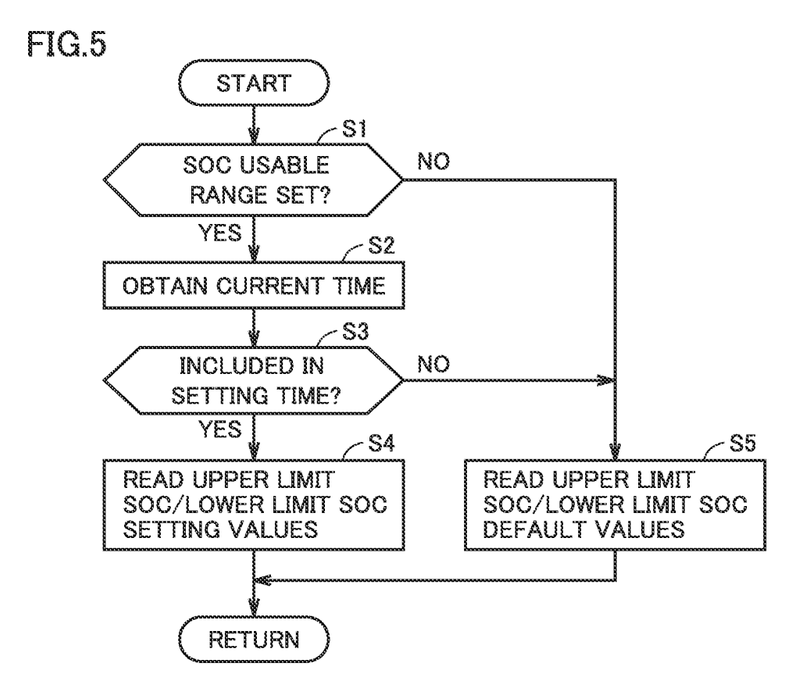
FIG. 5 is a flowchart showing an exemplary procedure of a process performed by an ECU of a vehicle in response to the setting of the SOC usable range.

FIG. 5 is a flowchart showing an exemplary procedure of a process performed by ECU 130 of vehicle 10 in response to the setting of the SOC usable range. A series of processes shown in this flowchart are invoked from a main routine and executed whenever a predetermined time passes or whenever a predetermined condition is established.

With reference to FIG. 5, ECU 130 determines whether or not the SOC usable range is set in user terminal 700 (step S1). When the SOC usable range is set in user terminal 700, each of the settings of the SOC usable range (upper limit SOC and lower limit SOC), setting time, and setting mode is transmitted from user terminal 700 to vehicle 10 and is stored in the memory of ECU 130. When each of the settings is stored in the memory, ECU 130 determines that the SOC usable range is set.

When ECU 130 determines that the SOC usable range is set in step S1 (YES in step S1), ECU 130 obtains a current time (step S2). Next, ECU 130 determines whether or not the current time is included in the setting time of the SOC usable range received from user terminal 700 (step S3).

When the current time is included in the setting time (YES in step S3), ECU 130 sets the respective setting values (the upper limit SOC setting value and the lower limit SOC setting value) of the SOC usable range received from user terminal 700 as the upper limit SOC and lower limit SOC of power storage device 100 (step S4).

On the other hand, when it is determined that the SOC usable range is not set in step S1 (YES in step S1) or when it is determined that the current time is not included in the setting time in step S3, ECU 130 sets the predetermined default values to the upper limit SOC and lower limit SOC of power storage device 100 (step S5).

Figure 6:
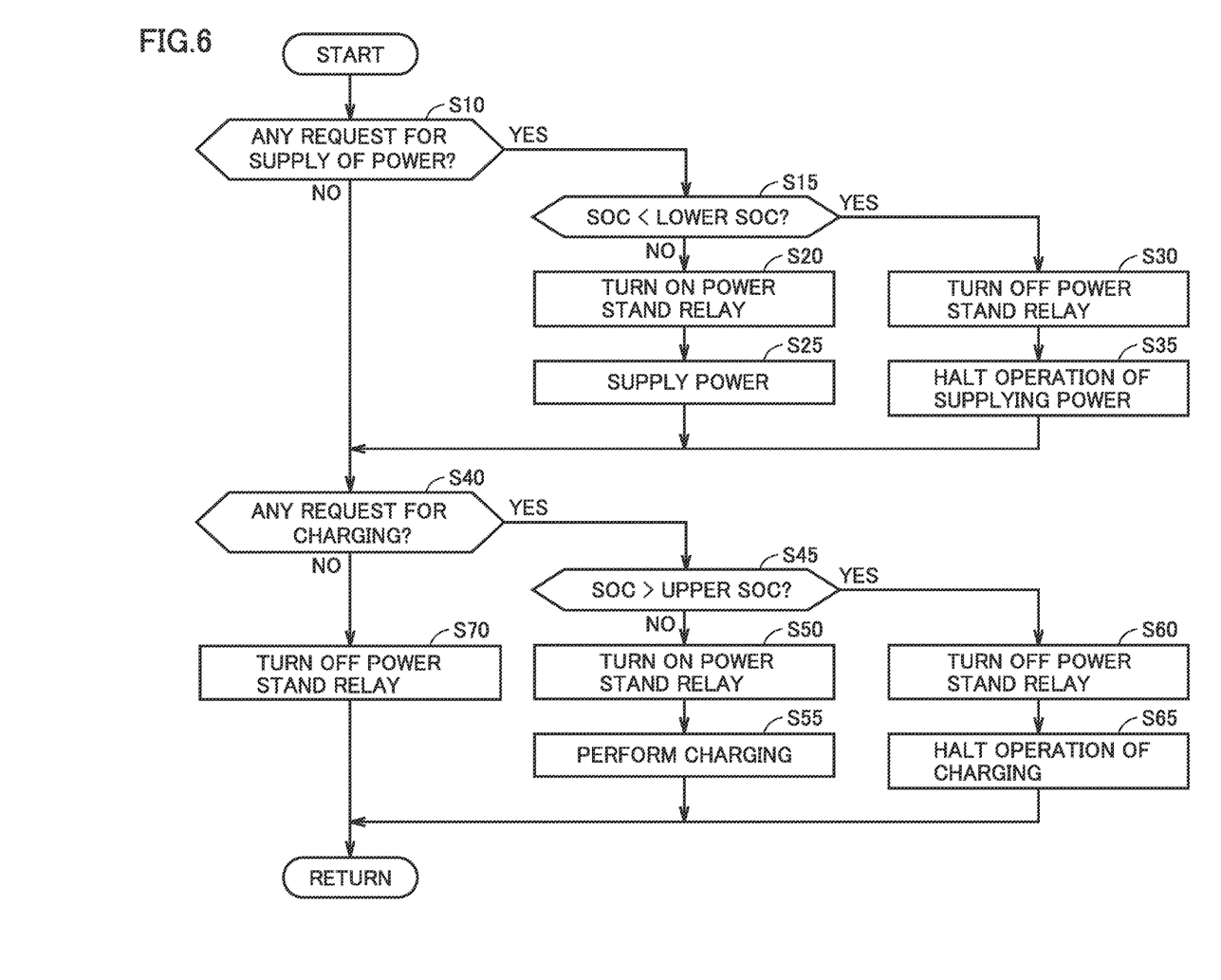
FIG. 6 is a flowchart showing an exemplary procedure of a charging/discharging control process performed by the ECU of the vehicle.

FIG. 6 is a flowchart showing an exemplary procedure of a charging/discharging control process performed by ECU 130 of vehicle 10. A series of processes shown in this flowchart are also invoked from the main routine and executed whenever a predetermined time passes or whenever a predetermined condition is established.

With reference to FIG. 6, ECU 130 determines whether or not there is a request for supply of power from vehicle 10 to power stand 200 (HEMS 300) (step S10). This request for supply of power is notified from HEMS 300 to vehicle 10. Whether or not there is a request for supply of power is determined based on a power-supplying request signal received from communication device 350 of HEMS 300 by communication device 140.

When it is determined that there is a request for supply of power in step S10 (YES in step S10), ECU 130 determines whether or not the SOC of power storage device 100 is lower than the lower limit SOC (step S15). This lower limit SOC is set by the series of processes shown in FIG. 5.

When it is determined that the SOC is more than or equal to the lower limit SOC in step S15 (NO in step S15), ECU 130 performs a process for turning on relay 210 of power stand 200 (step S20). For example, ECU 130 can turn on relay 210 by transmitting an ON command for relay 210 from communication device 140 to communication device 240 of power stand 200. Then, ECU 130 controls power converter 114 to supply power from vehicle 10 to power stand 200 (HEMS 300) (step S25).

On the other hand, when it is determined that the SOC is lower than the lower limit SOC in step S15 (YES in step S15), ECU 130 performs a process for turning off relay 210 of power stand 200 (step S30). For example, ECU 130 can turn off relay 210 by transmitting an OFF command for relay 210 from communication device 140 to communication device 240 of power stand 200. Then, ECU 130 halts the operation of power converter 114 for supplying power to power stand 200 (HEMS 300) (step S35).

When it is determined that there is no request for supply of power in step S10 (NO in step S10) or after performing the process of step S25 or step S35, ECU 130 determines whether or not there is a request for charging vehicle 10 using power stand 200 (HEMS 300) (step S40). This request for charging is also notified from HEMS 300 to vehicle 10. Whether or not there is a request for charging is determined based on a charging request signal received from communication device 350 of HEMS 300 by communication device 140.

When it is determined that there is a request for charging in step S40 (YES in step S40), ECU 130 determines whether or not the SOC of power storage device 100 is higher than the upper limit SOC (step S45). This upper limit SOC is set by the series of processes shown in FIG. 5.

When it is determined that the SOC is less than or equal to the upper limit SOC in step S45 (NO in step S45), ECU 130 performs a process for turning on relay 210 of power stand 200 (step S50). Then, ECU 130 controls power converter 114 to charge power storage device 100 using power stand 200 (step S55).

On the other hand, when it is determined that the SOC is higher than the upper limit SOC in step S45 (YES in step S45), ECU 130 performs a process for turning off relay 210 of power stand 200 (step S60). Then, ECU 130 halts the operation of power converter 114 for charging power storage device 100 (step S65).

Figure 7:
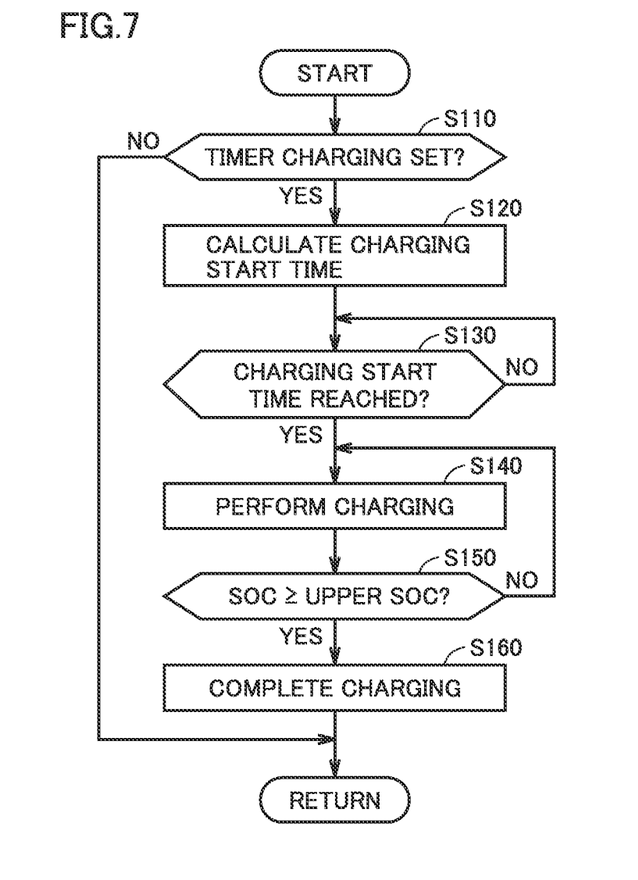
FIG. 7 is a flowchart showing an exemplary procedure of a timer charging process performed by an ECU of the vehicle.

FIG. 7 is a flowchart showing an exemplary procedure of a timer charging process performed by ECU 130 of vehicle 10. A series of processes shown in this flowchart are also invoked from the main routine and executed whenever a predetermined time passes or whenever a predetermined condition is established.

With reference to FIG. 7, ECU 130 determines whether or not the timer charging is set in user terminal 700 (step S110). When the timer charging is set in user terminal 700, each of the settings of the estimated departure time and the setting mode is transmitted from user terminal 700 to vehicle 10, and is stored in the memory of ECU 130. When each of the settings is stored in the memory, ECU 130 determines that the timer charging is set.

When it is determined that the tinier charging is not set in step S110 (NO in step S110), ECU 130 brings the process to return without performing a series of subsequent processes.

When it is determined that the timer charging is set in step S110 (YES in step S110), ECU 130 reads the set estimated departure time from the memory and plans a charging schedule for power storage device 100. Specifically, ECU 130 calculates a charging start time based on the estimated departure time, the upper limit SOC indicating the post-charging SOC, and the current SOC (step S120).

Then, ECU 130 determines whether or not the charging start time calculated in step S120 is reached (step S130). When the charging start time is reached (YES in step S130), ECU 130 controls power converter 114 to charge power storage device 100 using power stand 200 (step S140).

When power storage device 100 starts to be charged, ECU 130 determines whether or not the SOC reaches the upper limit SOC (step S150). When it is determined that the SOC is lower than the upper limit SOC (NO in step S150), the process is returned to step S140 and the charging of power storage device 100 is continued.

When the SOC reaches the upper limit SOC (YES in step S150), ECU 130 halts power converter 114 to end the charging of power storage device 100 (step S160).

As described above, in this first embodiment, when vehicle 10 is connected to power facility 20, the SOC usable range (upper limit SOC and lower limit SOC) of power storage device 100 is controlled in association with time. Therefore, according to this first embodiment, the SOC range can be controlled in consideration of the time period during which vehicle 10 is used. For example, while vehicle 10 is not used, the SOC usable range is expanded to flexibly cope with a power demand situation of power stand 200 (HEMS 300). On the other hand, during the time period during which vehicle 10 is used (time period during which vehicle 10 is highly likely to be used), the SOC usable range is increased to suppress vehicle 10 from having a decreased SOC upon use (traveling) of vehicle 10.

Moreover, since vehicle 10 is configured to perform the timer charging, according to this first embodiment, the schedule of the timer charging can be set appropriately in accordance with the SOC usable range set in consideration of the time period during which vehicle 10 is used.

Moreover, according to this first embodiment, since the upper limit SOC and the lower limit SOC can be set separately, the SOC of power storage device 100 can be managed to fall within a desired range in accordance with a schedule of use of vehicle 10 and a power demand situation of power facility 20 (HEMS 300).

Moreover, according to this first embodiment, since the SOC usable range can be set from user terminal 700, the SOC usable range and the time period during which the SOC usable range is used can be set from user terminal 700 by the user without riding on vehicle 10.

Second Embodiment

In this second embodiment, when power facility 20 is configured to not only supply power to vehicle 10 but also receive power from vehicle 10 as in the power system shown in FIG. 1, the SOC is permitted to transitionally (temporarily) exceed the upper limit SOC in vehicle 10 while vehicle 10 is connected to power facility 20.

Accordingly, when surplus power (for example, a surplus of power generated by solar panel 416) is generated at the power facility 20 side, the surplus power can be temporarily stored in vehicle 10 without wasting the surplus power, and when power demand of power facility 20 is then increased, the power stored in vehicle 10 can be returned to power facility 20.

The entire configuration of the power system in this second embodiment is the same as that of the power system shown in FIG. 1 according to the first embodiment.

Figure 8:
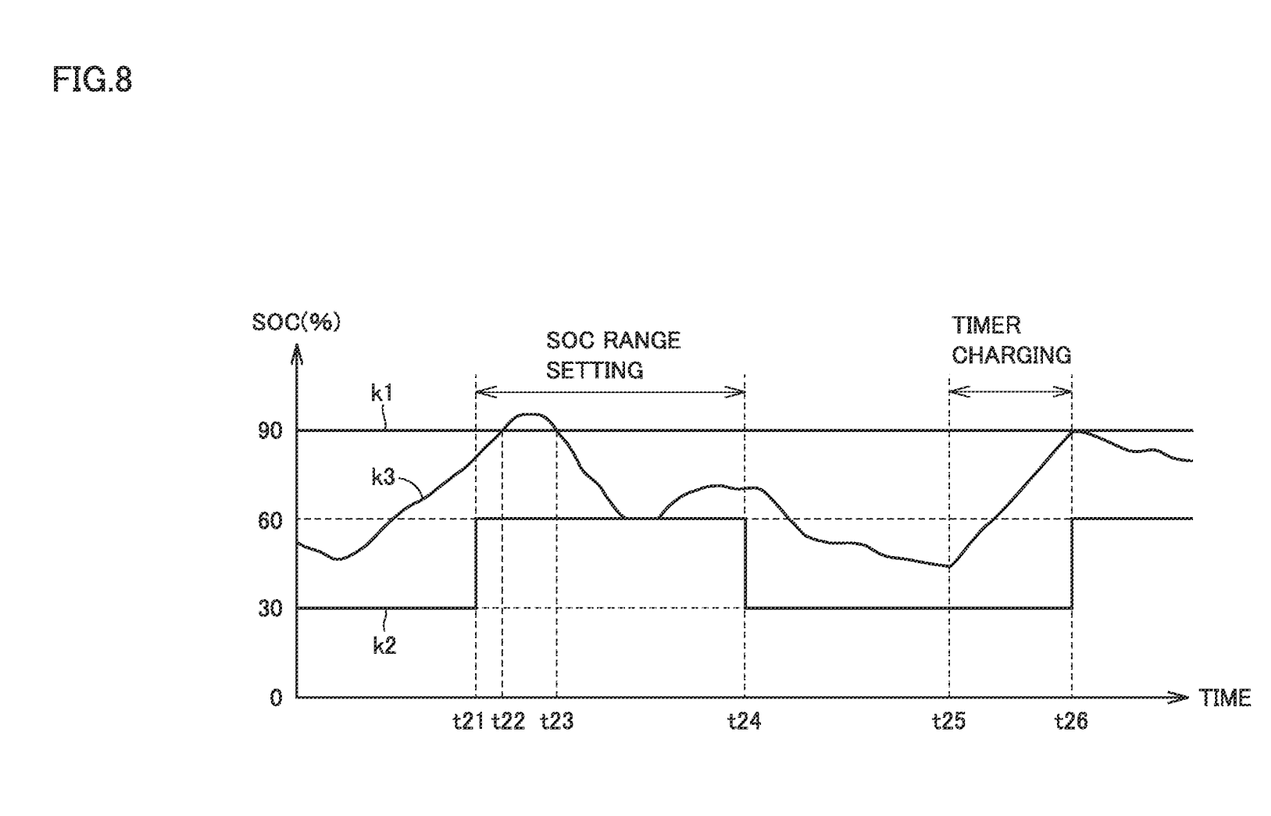
FIG. 8 shows an exemplary change in SOC with passage of time in the second embodiment.

FIG. 8 shows an exemplary change in SOC with passage of time in the second embodiment. FIG. 8 corresponds to FIG. 4 described in the first embodiment. With reference to FIG. 8, as with FIG. 4, lines k1, k2 respectively represent the upper limit SOC and the lower limit SOC, and line k3 represents an actual change in SOC.

Vehicle 10 is connected to power stand 200 via power cable 214, and power is exchanged between vehicle 10 and power facility 20. At time t22, the SOC has reached the upper limit SOC; however, an SOC exceeding the upper limit SOC is permitted in a period of times t22 to t23 because power facility 20 is configured to not only supply power to vehicle 10 but also receive power from vehicle 10.

Figure 9:
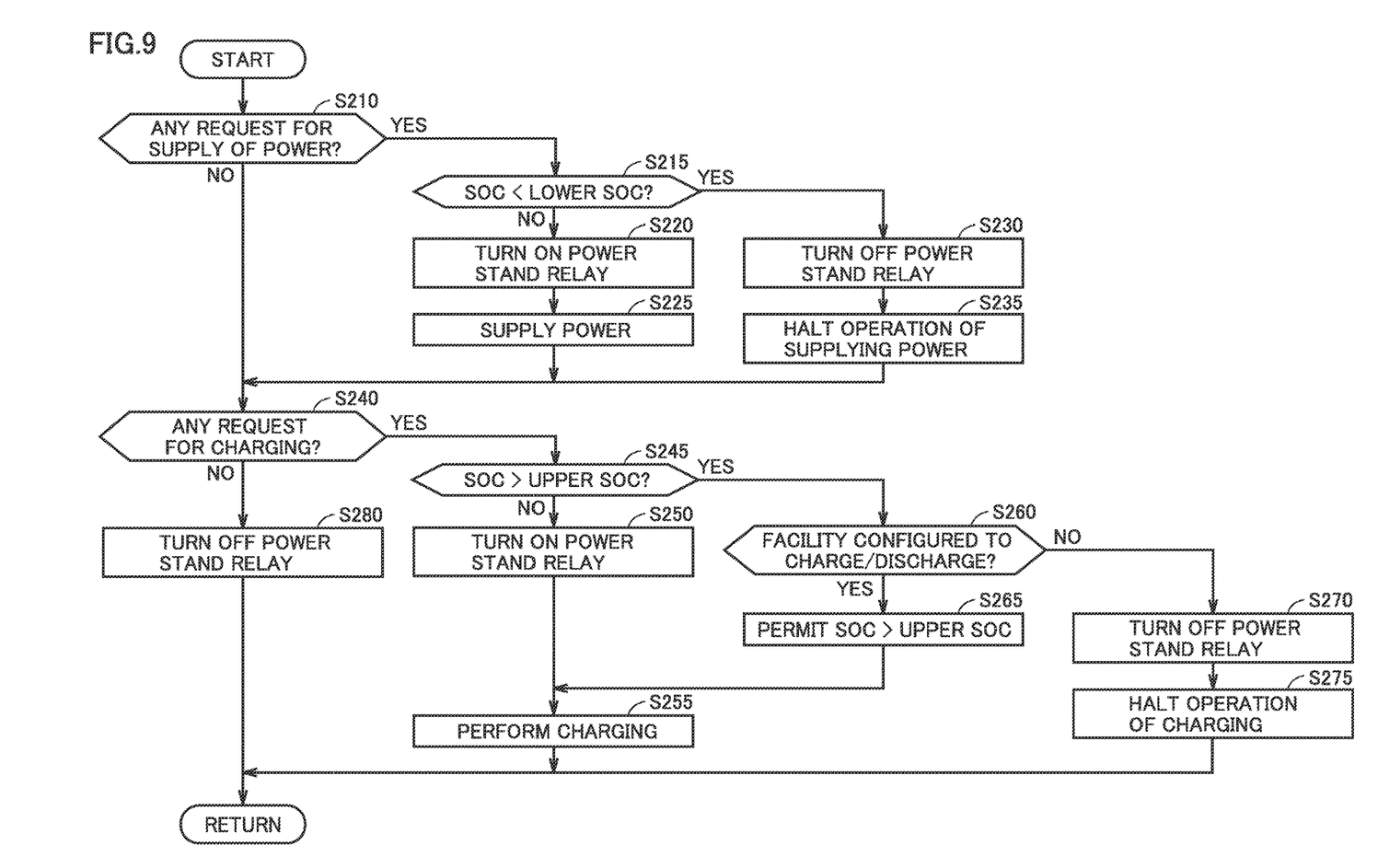
FIG. 9 is a flowchart showing an exemplary procedure of a charging/discharging control process performed by the ECU of the vehicle in a second embodiment.

FIG. 9 is a flowchart showing an exemplary procedure of a charging/discharging control process performed by ECU 130 of vehicle 10 in the second embodiment. A series of processes shown in this flowchart are also invoked from the main routine and executed whenever a predetermined time passes or whenever a predetermined condition is established.

With reference to FIG. 9, processes of steps S210 to S235 are respectively the same as those of steps S10 to S35 shown in FIG. 6.

Likewise, processes of steps S240, S245, S280 are respectively the same as those of steps S40, S45, S70 shown in FIG. 6. When it is determined that the SOC is higher than the upper limit SOC in step S245 (YES in step S245), ECU 130 determines whether or not the power facility to which vehicle 10 is connected is a facility configured to charge and discharge vehicle 10 (facility configured to not only supply power to vehicle 10 but also receive power from vehicle 10) (step S260).

It should be noted that whether or not the power facility to which vehicle 10 is connected is a facility configured to charge and discharge vehicle 10 can be checked through communication between communication device 140 of vehicle 10 and the communication device of the power facility, for example.

When it is determined that the power facility to which vehicle 10 is connected is a facility configured to charge and discharge vehicle 10 (YES in step S260), ECU 130 permits the SOC to be higher than the upper limit SOC (step S265). Then, ECU 130 brings the process to step S255. It should be noted that although not shown particularly, the operation of charging power storage device 100 may be halted when the SOC exceeds a predetermined absolute upper limit value or when the SOC continues to exceed the upper limit SOC for a predetermined time.

On the other hand, when it is determined that the power facility to which vehicle 10 is connected is not a facility configured to charge and discharge vehicle 10 (for example, a charging stand configured to only supply power to vehicle 10) in step S260 (NO in step S260), ECU 130 performs a process for turning off relay 210 of power stand 200 (step S270). Then, ECU 130 halts the operation of power converter 114 for charging power storage device 100 (step S275).

It should be noted that when it is determined that the SOC is less than or equal to the upper limit SOC in step S245 (NO in step S245), ECU 130 performs a process for turning on relay 210 of power stand 200 (step S250). Then, ECU 130 controls power converter 114 to charge power storage device 100 using power stand 200 (step S255).

As described above, in this second embodiment, when the power facility to which vehicle 10 is connected is a facility (for example, power facility 20) configured to supply power to vehicle 10 and receive power from vehicle 10, the SOC is permitted to exceed the upper limit SOC. Therefore, according to this second embodiment, surplus power or the like at the power facility 20 side can be transitionally stored in power storage device 100 of vehicle 10, and can be then supplied from vehicle 10 to power facility 20. As a result, the surplus power or the like generated in power facility 20 can be utilized effectively.

[Modification of Second Embodiment]

When power supplied to vehicle 10 from the power facility (which may be a charging stand configured to only supply power to vehicle 10) to which vehicle 10 is connected is surplus power (for example, surplus power resulting from solar power generation), the SOC may be permitted to transitionally (temporarily) exceed the upper limit SOC in vehicle 10. Accordingly, when surplus power is generated at the power facility side, the surplus power can be utilized by vehicle 10 without wasting the surplus power.

Figure 10:
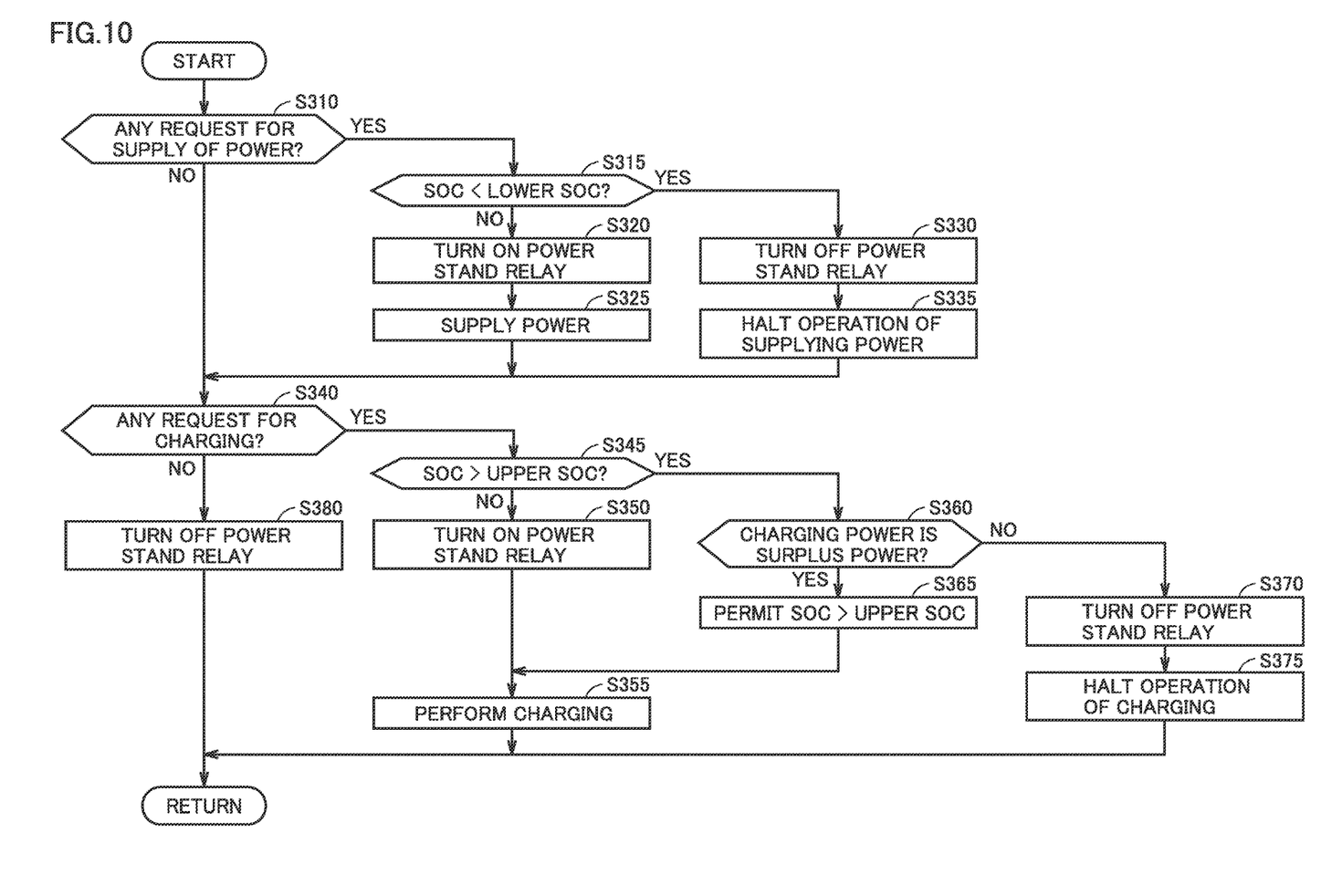
FIG. 10 is a flowchart showing an exemplary procedure of a charging/discharging control process performed by the ECU of the vehicle in a modification.

FIG. 10 is a flowchart showing an exemplary procedure of a charging/discharging control process performed by ECU 130 of vehicle 10 in this modification. A series of processes shown in this flowchart are also invoked from the main routine and executed whenever a predetermined time passes or whenever a predetermined condition is established.

With reference to FIG. 10, this flowchart is different from the flowchart of the second embodiment shown in FIG. 9 only in the following point: a process performed in step S360 is different from step S260 of the flowchart of FIG. 9. That is, processes of steps S310 to S355 and S365 to S380 shown in this flowchart are respectively the same as the processes of steps S210 to S255 and S265 to S280 shown in FIG. 9.

When it is determined that the SOC is higher than the upper limit SOC in step S345 (YES in step S345), ECU 130 determines whether or not charging power supplied from power facility 20 is surplus power (for example, a surplus of power generated by solar panel 416) (step S360). It should be noted that whether or not the charging power is surplus power can be checked through communication between communication device 140 of vehicle 10 and communication device 350 of HEMS 300, for example.

When it is determined that the charging power is surplus power in step S360 (YES in step S360), ECU 130 permits the SOC to be higher than the upper limit SOC (step S365). It should be noted that although not shown particularly in figures, the operation of charging power storage device 100 may be halted when the SOC exceeds a predetermined absolute upper limit value or when the SOC continues to exceed the upper limit SOC for a predetermined time.

On the other hand, when it is determined that the charging power is not surplus power in step S360 (NO in step S360), ECU 130 performs a process for turning off relay 210 of power stand 200 (step S370). Then, ECU 130 halts the operation of power converter 114 for charging power storage device 100 (step S375).

As described above, in this modification, when the power with which power storage device 100 is charged is surplus power (for example, a surplus of power generated by solar panel 416), the SOC is permitted to exceed the upper limit SOC. Therefore, according to this modification, the surplus power at the side of the power facility to which vehicle 10 is connected can be stored in power storage device 100 of vehicle 10 and can be utilized by vehicle 10 or can be thereafter supplied from vehicle 10 to power facility 20. As a result, the surplus power generated in the power facility can be utilized effectively.

It should be noted that it has been described that in each of the first and second embodiments and modification, the SOC usable range, the setting time therefor, and the timer charging are set by operating HMI device 720 of user terminal 700; however, the SOC usable range, the setting time therefor, and the timer charging can be set by operating HMI device 150 of vehicle 10 or operation panel 360 of HEMS 300.

It should be noted that in the description above, power converter 114 and connector 112 of vehicle 10 form one example of a "power supply device" in the present disclosure, and ECU 130 corresponds to one example of a "control device" in the present disclosure. Moreover, HMI device 720 of user terminal 700 or HMI device 150 of vehicle 10 corresponds to one example of a "setting device" in the present disclosure, and user terminal 700 corresponds to one example of a "terminal device" in the present disclosure. Moreover, vehicle 10 and user terminal 700 form one example of a "power control system" in the present disclosure.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
a power storage device;
a power supply device configured to supply, to outside the vehicle, power stored in the power storage device; and
a control device configured to control a usable range of an SOC of the power storage device in association with time, when the power supply device is connected to a power facility provided outside the vehicle,
wherein the power storage device is configured to receive power such that the SOC of the power storage device exceeds an upper limit of the usable range until the SOC of the power storage device exceeds the upper limit of the usable range for a predetermined time, wherein the predetermined time is set by the control device in advance of the SOC exceeding the upper limit and the predetermined time begins when the SOC of the power storage device exceeds the upper limit of the usable range.

2. The vehicle according to claim 1, wherein
the power supply device is further configured to charge the power storage device using power supplied from the power facility, and
the control device is further configured to set, in association with the time, the charging of the power storage device using the power supplied from the power facility.

3. The vehicle according to claim 1, further comprising a setting device configured to allow a user to set the usable range.

4. The vehicle according to claim 3, wherein the setting device is further configured to allow the user to set a time period during which the usable range is used.

5. The vehicle according to claim 3, wherein
the usable range is defined by an upper limit SOC indicating an upper limit of use of the SOC and a lower limit SOC indicating a lower limit of the use of the SOC, and
the setting device is configured to allow the user to set the upper limit SOC and the lower limit SOC separately.

6. The vehicle according to claim 1, further comprising a communication device configured to communicate with a terminal device of a user of the vehicle and receive, from the terminal device, the usable range set by the user in the terminal device.

7. The vehicle according to claim 6, wherein the communication device is further configured to receive, from the terminal device, a time period during which the usable range is used, the time period being set by the user in the terminal device.

8. The vehicle according to claim 1, wherein
the power supply device is further configured to charge the power storage device using power supplied from the power facility, and
the control device is configured to permit the SOC to exceed the upper limit of the usable range when the power facility is a facility configured to supply power to the vehicle and receive power from the vehicle.

9. The vehicle according to claim 1, wherein the control device is configured to permit the SOC to exceed the upper limit of the usable range when the power with which the power storage device is charged is surplus power resulting from solar power generation.

10. A power control system comprising:
a vehicle; and
a terminal device, wherein
the vehicle includes
a power storage device,
a power supply device configured to supply, to outside the vehicle, power stored in the power storage device, and
a control device configured to control a usable range of an SOC of the power storage device in association with time, when the power supply device is connected to a power facility provided outside the vehicle, and the terminal device includes
a setting device configured to allow a user to set the usable range, and
a communication device configured to transmit, to the vehicle, the usable range set by the user in the setting device,
the power storage device is configured to receive power such that the SOC of the power storage device exceeds an upper limit of the usable range until the SOC of the power storage device exceeds the upper limit of the usable range for a predetermined time, wherein the predetermined time is set by the control device in advance of the SOC exceeding the upper limit and the predetermined time begins when the SOC of the power storage device exceeds the upper limit of the usable range.

11. The power control system according to claim 10, wherein
the usable range is defined by an upper limit SOC indicating an upper limit of use of the SOC and a lower limit SOC indicating a lower limit of the use of the SOC, and
the setting device is configured to allow the user to set the upper limit SOC and the lower limit SOC separately.

* * * * *